United States Patent
Krancher et al.

(10) Patent No.: US 7,532,461 B2
(45) Date of Patent: May 12, 2009

(54) PORT INDICATOR

(76) Inventors: Robert E. Krancher, 5855 Bitternut, Houston, TX (US) 77092; Scott P. Saunders, 5806 Slashwood La., Spring, TX (US) 77379

(*) Notice: Subject to any disclaimer, the term of this patent is extended or adjusted under 35 U.S.C. 154(b) by 0 days.

(21) Appl. No.: 10/852,906

(22) Filed: May 25, 2004

(65) Prior Publication Data

US 2005/0264987 A1 Dec. 1, 2005

(51) Int. Cl.
*G06F 1/16* (2006.01)
*G06F 13/00* (2006.01)

(52) U.S. Cl. .............. 361/679.41; 361/679.45; 710/303; 710/304

(58) Field of Classification Search ......... 361/683, 361/686, 679; 710/303, 304; 708/139; 439/488–491
See application file for complete search history.

(56) References Cited

U.S. PATENT DOCUMENTS

| | | | | |
|---|---|---|---|---|
| 5,394,552 A * | 2/1995 | Shirota | ............... | 713/323 |
| 5,569,052 A * | 10/1996 | Belt et al. | ............... | 439/638 |
| 5,579,491 A * | 11/1996 | Jeffries et al. | ............... | 710/302 |
| 5,598,539 A * | 1/1997 | Gephardt et al. | ............... | 710/304 |
| 5,676,567 A * | 10/1997 | Gluskoter et al. | ............... | 439/638 |
| 5,781,744 A * | 7/1998 | Johnson et al. | ............... | 710/304 |
| 5,867,406 A * | 2/1999 | Yanagisawa | ............... | 708/140 |
| 6,497,368 B1 * | 12/2002 | Friend et al. | ............... | 235/472.01 |
| 6,519,669 B1 * | 2/2003 | Yanagisawa | ............... | 710/304 |
| 6,654,826 B1 * | 11/2003 | Cho et al. | ............... | 710/62 |
| 6,665,764 B2 * | 12/2003 | Wurzburg | ............... | 710/303 |
| 6,747,874 B2 * | 6/2004 | McKinnon et al. | ............... | 361/724 |
| 6,761,578 B1 * | 7/2004 | Stavely et al. | ............... | 439/489 |
| 6,804,740 B1 * | 10/2004 | Watts, Jr. | ............... | 710/303 |
| 6,833,989 B2 * | 12/2004 | Helot et al. | ............... | 361/686 |
| RE39,052 E * | 3/2006 | Charles et al. | ............... | 710/303 |
| 7,256,990 B2 * | 8/2007 | Grunow et al. | ............... | 361/686 |
| 7,381,095 B2 * | 6/2008 | Freeman et al. | ............... | 439/638 |
| 2003/0135681 A1 * | 7/2003 | Laity et al. | ............... | 710/303 |
| 2003/0161096 A1 * | 8/2003 | Yin | ............... | 361/683 |
| 2003/0197485 A1 * | 10/2003 | Miller et al. | ............... | 320/112 |
| 2004/0088466 A1 * | 5/2004 | Tang et al. | ............... | 710/303 |
| 2006/0085267 A1 * | 4/2006 | Lovegreen et al. | ............... | 705/15 |

OTHER PUBLICATIONS

IBM TDB Database, "Availability Indicator for I/O Port", Publ. Jan. 1, 1999.*

* cited by examiner

*Primary Examiner*—Jayprakash N Gandhi
*Assistant Examiner*—Anthony Q Edwards

(57) ABSTRACT

A docking station includes a port with a corresponding status indicator.

31 Claims, 4 Drawing Sheets

PORT INDICATOR

BACKGROUND

Advances in electronics, batteries and packaging technology have led to continued increases in the number of mobile computing devices in service. Some docking stations can accommodate various models of mobile computing devices. Difficulty can arise when the docking station permits more ready access to features, components and/or peripherals than the mobile computing device in the docking station.

DETAILED DESCRIPTION

Figure 1:
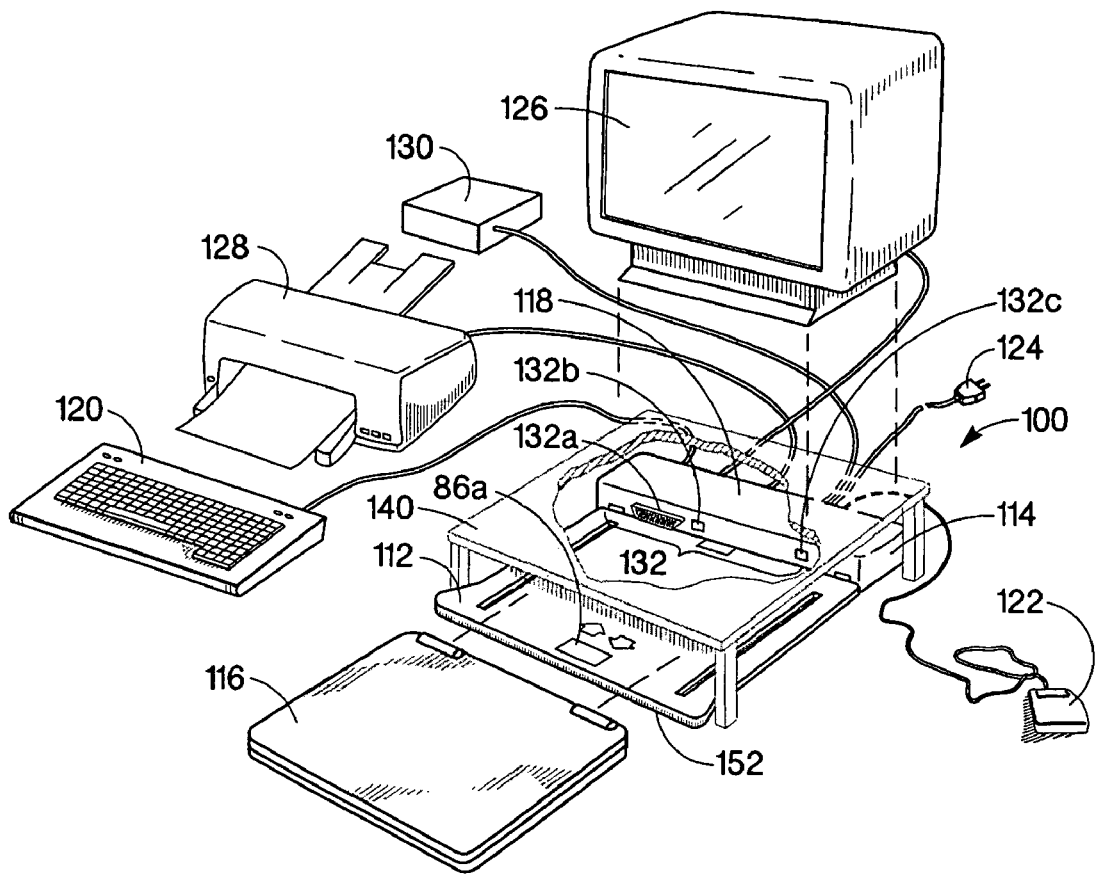
FIG. 1 illustrates a perspective view of a mobile computing system in accordance with an embodiment.

FIG. 1 illustrates a perspective view of a mobile computing system 100 in accordance with an embodiment. In an embodiment, the system 100 includes a docking station 114 and a mobile computing device 116. The docking station 114 has a base 118, which usually rests on a desk or the like. The base 118 is operably connected to one or more computing components and peripherals, such as a keyboard 120, mouse 122, power source 124, monitor 126, printer 128, and computer network 130, in an embodiment. In an embodiment, the docking station 114 can be used to charge an internal battery of the device 116 as well as to provide a power source to the device 116.

In order to maximize the available desk space, the docking station 114 is usually positioned beneath a monitor stand 140 supporting the auxiliary monitor 126 as shown in FIG. 1. As shown by the arrows in FIG. 1, to connect the device 116 to the docking station 114, the device 116 is slid under the monitor stand 140 until an at least one docking interface 134 (shown in FIG. 3B) of the device 116 is removably connected with an at least one docking interface 132 on the docking station, in an embodiment. In an embodiment, a docking tray 112 of the station 114 facilitates and aligns the docking interface 132 on the station 114 with their respective mating and/or the docking interface 134 (shown in FIG. 3B) on the device 116. The base 118 includes a plurality of the docking interfaces 132, such as a printer connector 132a, a universal serial bus connector 132b, and a power supply connector 132c, positioned to detachably and operably secure respective docking interfaces (or mating connectors) 134 on the mobile computing device 116, in an embodiment. When the mobile computing device 116 is connected to the docking station 114, at least some of the components and peripherals operate with the mobile computing device 116.

In an embodiment, a latching and/or detaching or ejection mechanism 152 is included on the docking tray 112 and/or on the base 118 to detachably secure the mobile computing device 116 to the docking station 114. In an embodiment, the mechanism 152 can deflect the device 116 from engagement with the station 114 when a lever or similar handle on the station 114 and/or on the device is moved by the computer user 142. In another embodiment, the mechanism 152 detaches the device 116 upon activation from the user using one of the computer input devices, such as the keyboard 146.

In an embodiment, the docking station 114 accommodates various models of mobile computing devices each having support for different features, as discussed in more detail herein. In an embodiment, the mobile computing device 116 is interchangeable in the docking station 114. In an embodiment, the mobile computing device 116 includes at least one of a portable computer, a laptop, and a notebook.

Figure 2:
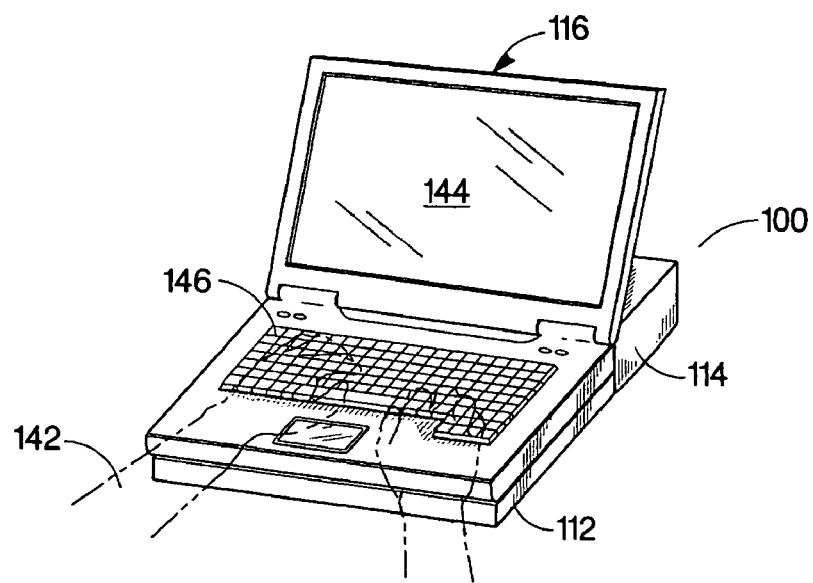
FIG. 2 illustrates a mobile computing device of FIG. 1, in an embodiment.

In FIG. 2, the mobile computing device 116 is shown having a screen display 144 and being in an open position. In another embodiment, shown in FIG. 2, the docking station 114 allows a computer user 142 to use the display 144, keyboard 146 and other input devices on the device 116. In this embodiment, the docking station 114 serves to provide a source of power to the device 116 and/or a connection to the printer 128 or to the computer network 130.

Figure 3A:
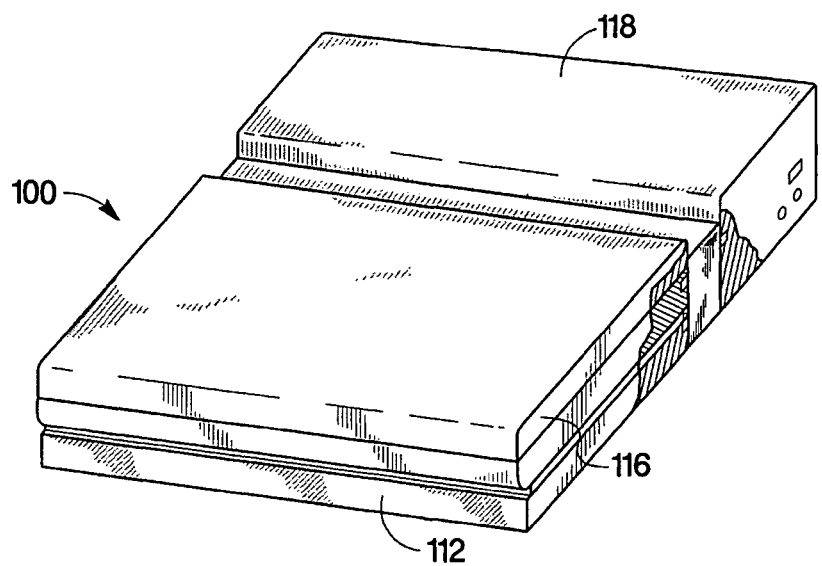
FIG. 3A illustrates a perspective view of a mobile computing device in a docking station in an embodiment.
Figure 3B:
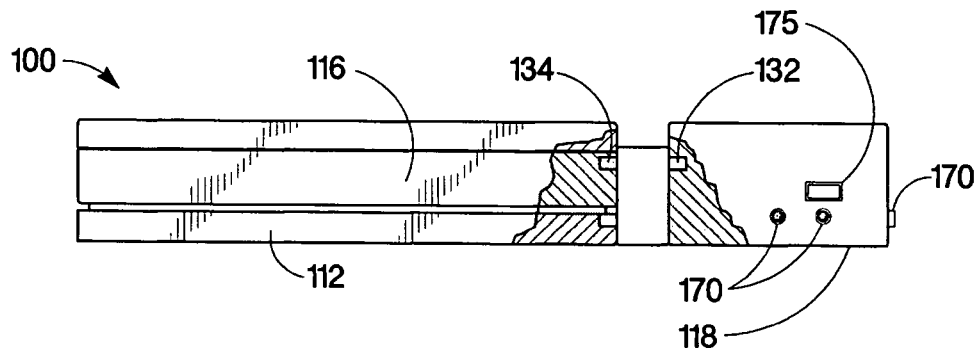
FIG. 3B illustrates a side view of a mobile computing device in a docking station in an embodiment.
Figure 3C:
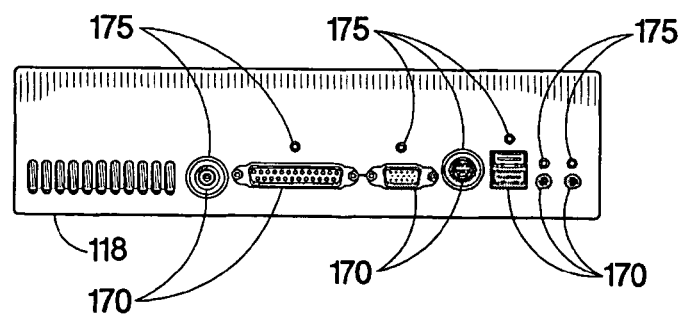
FIG. 3C illustrates a rear view of the mobile computing device of FIG. 3B.

Referring to FIGS. 3A and 3B, a perspective and side views illustrate the mobile computing device 116 docked into the docking station 114 in accordance with an embodiment. FIG. 3A illustrates the device 116 in a closed, folded position. In this closed position, the device 116 has a substantially low profile and can readily fit under the monitor stand 140 or in another inconspicuous space.

As shown in an embodiment of FIGS. 3A and 3B, the base 118 of the docking station 114 includes a port replicator. In an embodiment, the port replicator has at least one replicating port 170. The at least one replicating port 170 may include a feature and/or an external port or connector. The at least one port 170 couples with the one or more of the computing features, components, and/or peripherals, such as the keyboard 120, the mouse 122, the power source 124, the monitor 126, the printer 128, and the computer network 130. In an embodiment, the at least one port 170 may include a digital visual interface (DVI), a 1394 serial bus jack, a gigabit Ethernet local area network port, and/or a universal serial bus (USB) port, among other possible components or peripherals.

In an embodiment, the docking station 114 includes a status indicator 175 associated with a corresponding replicating external port 170. In an embodiment, there are a plurality of external ports 170 and a corresponding plurality of status indicators 175 of the plurality of external ports 170.

In an embodiment, the status indicator 175 is a visual indicator on the docking station 14. In an embodiment, the status indicator 175 is a visual indicator on the base 118, such as adjacent a corresponding port 170. In an embodiment, the status indicator 175 includes an on-screen visual indicator on at least one of the monitors. In an embodiment, the status indicator 175 includes an on-screen visual indicator on at least one of the monitor screens 126, 144. In an embodiment, the status indicator 175 is a visual indicator on the tray 112, such as near a power button (not shown) or near a device releasing lever (not shown), or in a control panel (not shown).

In an embodiment, the status indicator 175 includes a light emitting diode. In an embodiment, the light emitting diode emits a green light when indicating an active replicating port status, and emits a red light when indicating an inactive replicating port status. In an embodiment, the status indicator 175 includes a light emitting diode ring around the associated external port 170. In an embodiment, the status indicator 175 includes text. In an embodiment, the status indicator 175 includes an audio sound, such as a buzz, when a component or periphery cable is coupled to an inactive, non-functional port 170. In an embodiment, the status indicator 175 includes a vibration or an electrical pulse, when a component or periphery cable is coupled to an inactive, non-functional port 170. The status indicator 175 is not limited to the visual, audio, and other sensory indicators described herein, and includes any status indicator of a port 170.

In an embodiment, the docking station 114 includes a means for indicating a status of the replicating port 170. In an embodiment, the means for indicating includes at least one of the indicators described above.

Figure 4A:
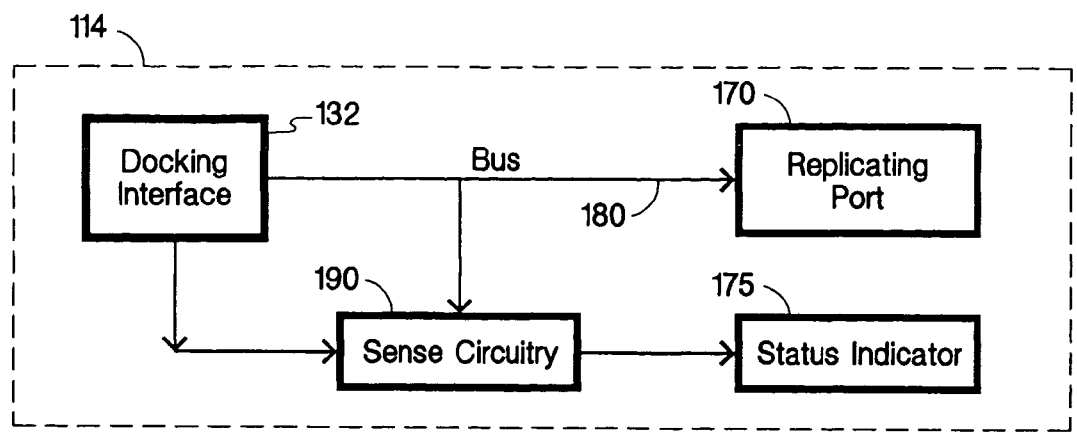
FIG. 4A illustrates a diagram of a coupling of a docking station and a mobile computing device in an embodiment.

As shown in the embodiment of FIG. 4A, the at least one docking interface 132 is electrically coupled to the at least one replicating port 170 via a bus 180. In an embodiment, the bus 180 communicates with at least one of a battery, a clock generator, a thermal monitor, and other possible devices. In an embodiment, the bus 180 is a System Management Bus (SM-Bus™ Intel Corp). In an embodiment shown in FIG. 5, the bus 180 includes a two-wire serial bus, such as an I²C (Inter-IC) bus® Phillips Electronics. In an embodiment, the station 114 includes sense circuitry 190 which senses a signal of the bus 180. In an embodiment, the indicator 175 is electrically coupled with the sense circuitry 190. In an embodiment, the indicator 175 indicates a status of the external replicating port 170.

The at least one replicating port 170 may be activated and functional when a corresponding docking interface 134 of the device 116 couples to the corresponding docking interface 132 of the station 114, in an embodiment. The at least one replicating port 170 may be inactivated, and non-functional until a corresponding docking interface 134 of the device 116 couples to the corresponding docking interface 132 of the station 114, in an embodiment.

In an embodiment, the device 116 does not support a particular feature associated with one of the particular replicating ports 170 of the station 114 to which the device 116 is connected. In an embodiment, that particular port 170 is inactive. In an embodiment, other ports 170 are active, while particular ports are inactive.

In an embodiment, the sense circuitry 190 includes a hardware detection circuit (not shown) for each port 170. In embodiments, the hardware detection circuit varies depending upon the type of port 170 and/or bus 180 being detected. In an embodiment, the hardware detection circuit includes a pull-up/down resistor to sense the bus 180. In an additional embodiment, the hardware detection circuit includes monitoring traffic on the bus 180 to determine whether a port 170 is active.

Figure 4B:
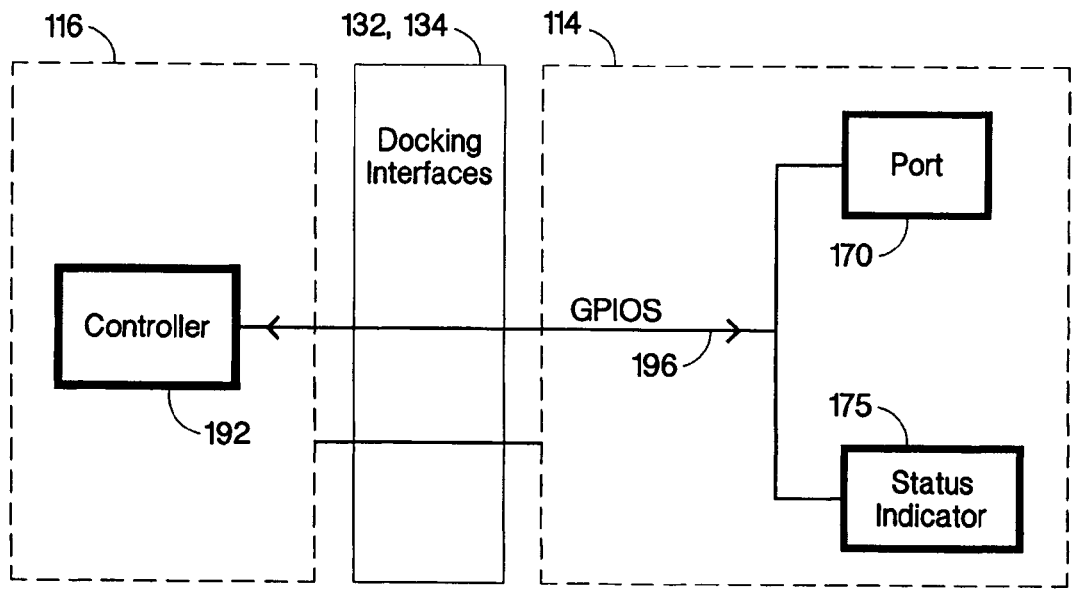
FIG. 4B illustrates a diagram of a coupling of a docking station and a mobile computing device in an embodiment.

In an embodiment shown in FIG. 4B, the device 114 includes a controller 192, coupled with a General Purpose Input/Output Sub-System (GPIOS) 196. In an embodiment, the GPIO passes through the interfaces 132, 134 to the port(s) 170 being identified. In an additional embodiment, the controller 192 sets the GPIOs 196, which are used to drive signals to the indicators 175, as described in more detail below.

In an embodiment, the controller 192 includes at least one of an embedded controller (EC) and a keyboard controller (KBC). The KBC and EC each have multiple functions that include at least one of the following: monitoring power and stand-by buttons; monitoring alternating current (AC) events, such as external power, and monitoring for the presence of a battery, including charging of the battery; and scanning the keyboard(s) 120, 146 for a depressed key and passing this information to an operating system of the device 116 via a Basic Input-Output System (BIOS) of the device 116. In an embodiment, the depressed key is a key that wakes up the device 116. The KBC or EC scans to find out which key is pressed. In an embodiment, the KBC or EC is substantially easy to program and communicates with the BIOS.

In an embodiment, a program is written in the BIOS including a look-up table for systems of the mobile computing device 116. In an embodiment, the look-up table indicates which ports 170 are supported and which ports 170 are not supported by the device 116.

In the following table there are three (3) example mobile computing devices, A, B, and C. In an embodiment, each of the devices 116 includes the look-up table in the BIOS code. Each device is aware whether it is A, B, or C, as this information is programmed in the device during manufacturing. "1" indicates that the port is supported, while "0" indicates the particular port is not supported by the device 116, in these embodiments.

| Device | ID1394 | Gigabit | DVI |
|--------|--------|---------|-----|
| A | 1 | 0 | 1 |
| B | 0 | 1 | 0 |
| C | 1 | 1 | 1 |

In an embodiment, the BIOS communicates with the controller 192. In an embodiment, the controller determines what ports are supported by using the look-up table. In an embodiment, after the controller is aware of what ports 170 are supported, the respective status indicators 175 may be set in several ways. In embodiments, the indicators 175 are set by at least two methods and systems:

(1) The device 116 sends the GPIOS control signal 196 discretely for each port 170 via available pins on the docking interface 132 indicating whether the particular port is supported. In an embodiment, the GPIOS control signals 196 control the respective indicators 175, as shown in FIG. 4B.

Figure 5:
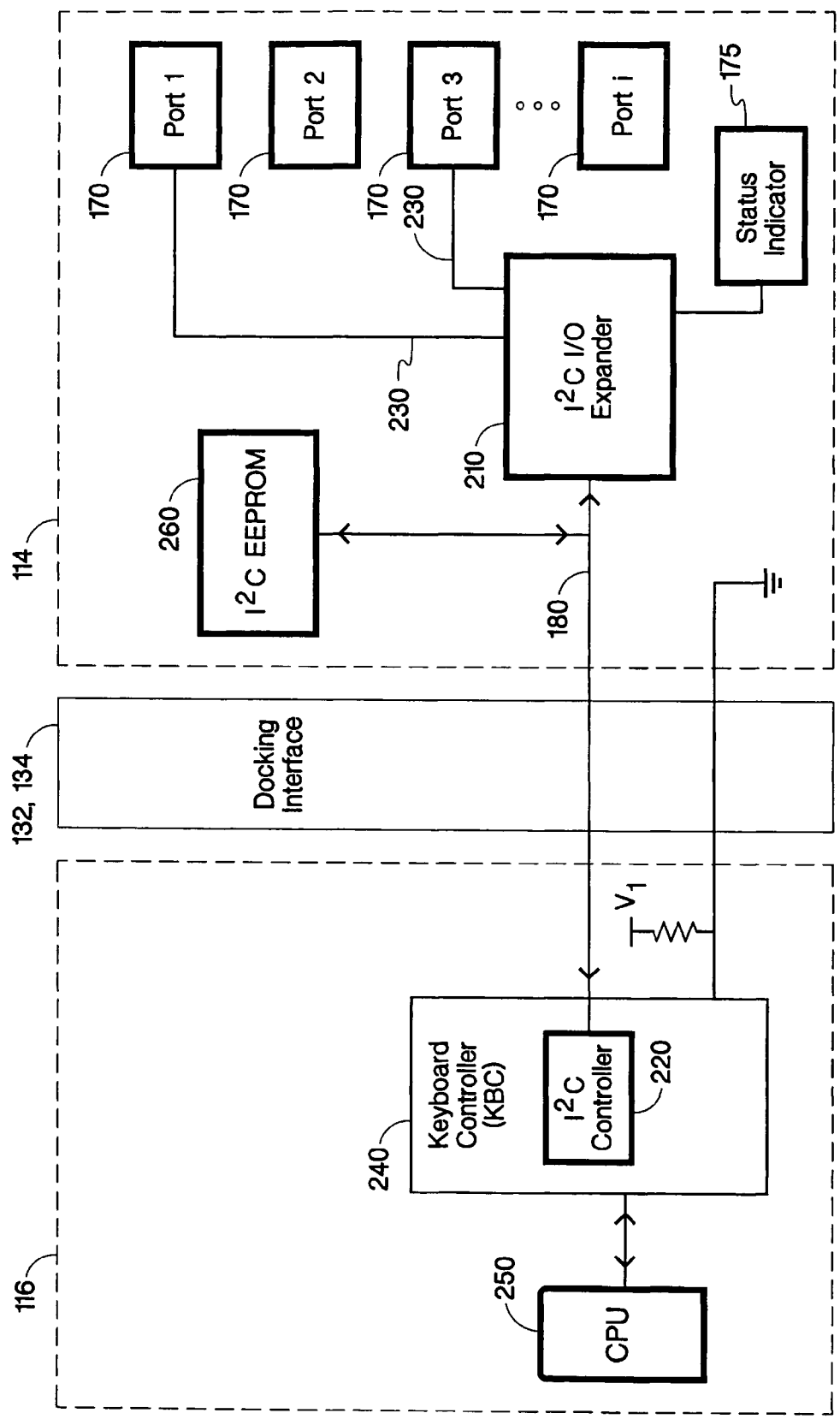
FIG. 5 illustrates a diagram of a coupling of a docking station and a mobile computing device in an embodiment.

(2) In an embodiment shown in FIG. 5, in particular where pins on the docking interface 132 are not used, the device 116 sends a control signal discretely for each port 170 across the docking interfaces 132, 134, using an I²C bus 180 and an I²C expander 210. In this embodiment, the controller 192 includes at least one of the keyboard controller 240 or the embedded controller. In an embodiment, the controller sets General Purpose Input/Outputs (GPIOs) 230 by sending signals or commands over the I²C bus 180.

In the embodiment shown in FIG. 5, the bus 180 includes the I²C bus. In an embodiment, the docking station 114 includes an I²C I/O Expander 210 which couples with an I²C controller 220 in the device 116 via the I²C bus 180 through the docking interfaces 132, 134. In an embodiment, the keyboard controller 240 (KBC) of the device 116 includes the I²C controller. The KBC 240 is coupled to a central processing unit 250 of the device 116. In an embodiment, the bus 180 is coupled to an I²C EEPROM 260 in at least one of the docking station 114 and the device 116.

In an embodiment, the I²C I/O Expander 210 is coupled via the GPIOs (General Purpose Input/Outputs) 230 to the respective ports 170. The I²C Expander 210 is coupled to at least one status indicator 175, and particularly to a set of indicators 175. In an embodiment, the I²C I/O Expander 210 senses the status of the port(s) and communicates that status to the corresponding indicator(s) 175.

In an embodiment, the sense circuitry 190 includes at least one of the I²C I/O Expander, the hardware detection circuit, the keyboard controller, the embedded controller, the I²C controller, and the GPIOS. In an embodiment, the docking station 114 includes a means for sensing whether a replicating port 170 is active. In an embodiment, the means for sensing includes the sense circuitry 190 coupled to the bus to sense a bus signal. In an embodiment the means for sensing includes an I²C I/O Expander. In an embodiment the means for sensing includes hardware detection circuit for each port 170. In an embodiment the means for sensing includes the EC or the keyboard controller.

In an embodiment, the indicator 175 is able to provide feedback and/or able to respond to a status change in at least one of the replicating port 170 and the mobile computing device 116. In an embodiment, the status indicator 175 is able to respond to a change in support status of a feature of the device 116 and/or a status change in the external port.

In an embodiment, if a feature of the docking station 114, such as DVI, is either enabled or disabled in an update of the BIOS or refresh of the mobile computing device 116, the docking station 114 senses the current status of the corresponding port 170. In an embodiment, this dynamic, real-time status is communicated to the user via the appropriate indicator 175. In an embodiment, the mobile computing device 116 is not first removed from the docking station in order to indicate the status of the feature. In another embodiment, the mobile computing device 116 is first removed from the docking station to indicate the status of the feature, and then redocked to indicate an updated status on the indicator 175.

In an embodiment, the system 100 includes a means for responding to a change in the status of the replicating port 170. In an embodiment, the means for responding includes the indicator 175.

Figure 6:
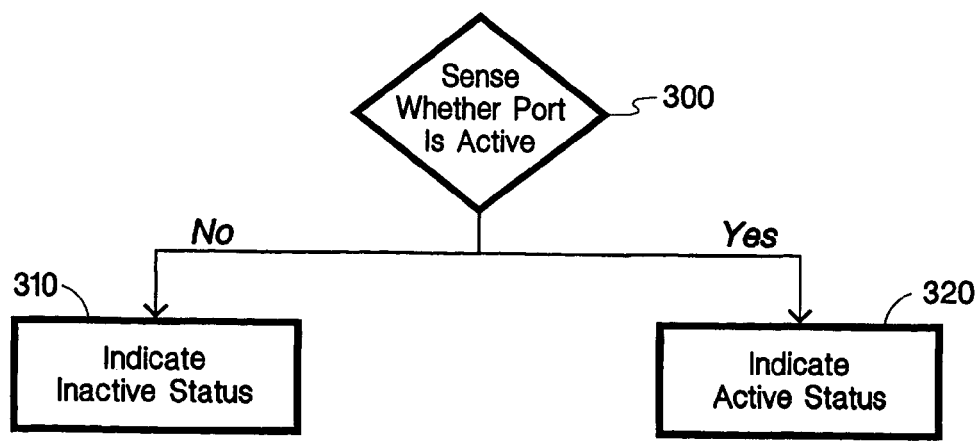
FIG. 6 illustrates a flow chart of status sensing of a bus signal of a port according to an embodiment.

In an embodiment, at 300 in FIG. 6, the system 100 senses whether a port 170 is active. In an embodiment, at 310, if the port 170 is not active, then an inactive status is indicated. In an embodiment, at 320, if the port 170 is active, then an active status is indicated. In an embodiment, the status indicator 175 indicates whether the external port 175 is active. In an embodiment, the device 116 supports a feature that corresponds to the external port 170, wherein the status indicator 175 indicates that the external port 170 is active. In an embodiment, the device 116 does not support a feature that corresponds to the external port 170, wherein the status indicator 175 indicates that the external port 170 is inactive. In an embodiment, indicating a status of the replicating port includes emitting a green light when indicating an active replicating port status, and emitting a red light when indicating an inactive replicating port status. However, other types of status indicators are also possible.

The elements, materials, geometries, dimensions, and sequence of operations can all be varied to suit particular applications. Parts of some embodiments may be included in, or substituted for, those of other embodiments. Various embodiments also could be used in conjunction with various types of electronic assemblies and is not meant to be limited in use.

The illustrations of embodiments described herein are intended to provide a general understanding of the structure of various embodiments, and they are not intended to serve as a complete description of all the elements and features of apparatus and systems that might make use of the structures described herein. Applications that may include the apparatus and systems of various embodiments include all types of consumer electronics including high-speed computers, communication and signal processing circuitry, modems, processors, and application-specific modules, including multilayer, multi-chip modules. Such apparatus and systems may further be included as sub-components within a variety of electronic systems, such as televisions, cellular telephones, personal computers, personal digital assistants (PDAs), workstations, radios, video players, vehicles, and others.

FIGS. 1 to 6 are merely representational and are not drawn to scale. Certain proportions thereof may be exaggerated, while others may be minimized. Many other embodiments will be apparent to those of skill in the art upon reviewing the above description. Parts of some embodiments may be included in, or substituted for, those of other embodiments.

While the foregoing examples of dimensions and ranges are considered typical, the various embodiments are not limited to such dimensions or ranges. It is recognized that the trend within industry is to generally reduce device dimensions for the associated cost and performance benefits.

The accompanying drawings that form a part hereof show by way of illustration, and not of limitation, specific embodiments in which the subject matter may be practiced. Embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of embodiments herein may be made without departing from the principles and scope of embodiments as expressed in the subjoined claims.

The invention claimed is:

1. A docking station comprising:
   a docking station base having a port with a corresponding status indicator, wherein the docking station can selectively be docked to mobile computing devices having different port capabilities; and
   a sense circuit is coupled to the status indicator and receives a control signal from a mobile computing device indicative of whether the mobile computing device is compatible with the port,
   wherein, when the port is supported by a docked mobile computing device, the control signal causes the sense circuit to cause the status indicator to show that the port is compatible with a mobile computing device,
   wherein, when the port is not supported by a docked mobile computing device, the control signal causes the sense circuit to cause the status indicator to show that the port is incompatible with a mobile computing device.

2. The docking station of claim 1 wherein the indicator includes a light emitting diode.

3. The docking station of claim 2 wherein the light emitting diode emits a green light when indicating an active port status, and emits a red light when indicating an inactive port status.

4. The docking station of claim 1 wherein the indicator is located adjacent to the port.

5. The docking station of claim 1 further comprising a first docking interface electrically coupled to said port, wherein said first docking interface is capable of interfacing to a second docking interface on a mobile computing device, wherein the indicator is able to respond to a status change in at least one of the port and the mobile computing device.

6. A port replicator comprising:
 a first docking interface capable of interfacing with a second docking interface on a mobile computing device;
 an external port electrically coupled with said first docking interface via a bus;
 sense circuitry electrically coupled with the bus; and
 an indicator of a status of the external port, wherein the indicator is electrically coupled with the sense circuitry,
wherein, when the sense circuitry determines the external port is supported by the mobile computing device, the sense circuitry causes the indicator to provide an active external port status that indicates that the external port is compatible with the mobile computing device,
wherein, when the sense circuitry determines the external port is not supported by the mobile computing device, the sense circuitry causes the indicator to provide an inactive external port status that indicates that the external port is not compatible with the mobile computing device.

7. The port replicator of claim 6 further comprising a light emitting diode (LED) drive signal electrically coupled to the indicator.

8. The port replicator of claim 7 wherein an LED receiving the LED drive signal emits a green light when providing the active external port status, and emits a red light when providing the inactive external port status.

9. The port replicator of claim 6 wherein the indicator is located adjacent to the external port.

10. The port replicator of claim 6 further comprising a plurality of external ports and a corresponding plurality of status indicators of the plurality of external ports.

11. The port replicator of claim 6 wherein the external port includes a digital visual interface (DVI).

12. The port replicator of claim 6 wherein the external port includes a 1394 serial bus jack.

13. The port replicator of claim 6 wherein the external port includes a gigabit Ethernet local area network port.

14. The port replicator of claim 6 wherein the external port includes a universal serial bus (USB) port.

15. The port replicator of claim 6 wherein the indicator is able to respond to a status change in the external port.

16. A method comprising:
 a sense circuit detecting whether a replicating port of a docking station is compatible with a portable computing device;
 if the replicating port is compatible, indicating an active replicating port status that indicates that the replicating port is compatible with the portable computing device; and
 if the replicating port is not supported, indicating an inactive replicating port status that indicates that the replicating port is not compatible with the portable computing device.

17. The method of claim 16 further comprising electrically coupling a mobile computer docking interface and the replicating port with a bus, wherein detecting whether the replicating port is compatible includes sensing a port support signal via the bus.

18. The method of claim 16 wherein indicating a status of the replicating port includes emitting a green light when indicating the active replicating port status, and emitting a red light when indicating the inactive replicating port status.

19. The method of claim 17 further comprising responding to a status change in the replicating port.

20. A port replicator of a docking station comprising:
 means for docking a portable computing device:
 means for sensing whether a replicating port is compatible with a portable computing device; and
 means for indicating a compatibility status of the replicating port based on said means for sensing wherein said means for indicating includes control signal means to display an active and inactive external port status.

21. The port replicator of claim 20 further comprising a bus to electrically couple a mobile computer docking interface and the replicating port,
 wherein the means for sensing includes a sense circuitry coupled to the bus to sense a bus signal.

22. The port replicator of claim 20 wherein the means for indicating includes a light emitting diode to emit a green light for an active replicating port status, and to emit a red light for an inactive replicating port status.

23. The port replicator of claim 20 further comprising means for responding to a change in the status of the replicating port.

24. The port replicator of claim 23 wherein the means for responding includes a light emitting diode to emit light indicating the status of the replicating port.

25. A system comprising:
 a mobile computing device having a first docking interface;
 a docking station having:
  a second docking interface capable of interfacing with the first docking interface;
  a bus with a bus signal;
  an external port electrically coupled with said second docking interface via said bus; and
  sense circuitry electrically coupled with the bus; and
 a status indicator, wherein the indicator is electrically coupled with the sense circuitry to indicate a status of the external port,
wherein the sense circuitry receives a control signal from the mobile computing device, the control signal indicating whether the mobile computing device is compatible with the external port,
wherein, when the control signal indicates the mobile computing device is compatible with the external port, the sense circuitry causes the status indicator to display an active external port status,
wherein, when the control signal indicates the mobile computing device is not compatible with the external port, the sense circuitry causes the status indicator to display an inactive external port status.

26. The system of claim 25 wherein the mobile computing device further comprises a Basic Input/Output System (BIOS) and a controller in communication with the BIOS, the controller determines if the external port is supported based on information stored in the BIOS and provides the control signal to the sense circuitry via the bus.

27. The system of claim 25 wherein the mobile computing device further comprises a Basic Input/Output System (BIOS) and a controller in communication with the BIOS, wherein, when a BIOS update changes a support status of the external port, the controller detects said change and provides an updated control signal to the sense circuitry via the bus.

28. The system of claim 25 wherein the status indicator is adjacent the external port.

29. The system of claim 25 wherein the status indicator is able to respond to a status change in the external port.

30. The system of claim 25 wherein the status indicator is able to respond to a change in support status of a feature of the mobile computing device.

31. The system of claim 25 wherein the sense circuitry includes at least one of an $I^2C$ I/O Expander, a hardware detection circuit, a keyboard controller, a $I^2C$ controller, and a GPIOS.

* * * * *